(12) United States Patent
Stoupa

(10) Patent No.: US 7,124,901 B2
(45) Date of Patent: Oct. 24, 2006

(54) COOKING DEVICE FOR COOKING CORN

(76) Inventor: Chandra Stoupa, 17625 Leavenworth, Omaha, NE (US) 68118

( * ) Notice: Subject to any disclaimer, the term of this patent is extended or adjusted under 35 U.S.C. 154(b) by 315 days.

(21) Appl. No.: 10/845,749

(22) Filed: May 14, 2004

(65) Prior Publication Data
US 2004/0226455 A1    Nov. 18, 2004

Related U.S. Application Data

(60) Provisional application No. 60/471,456, filed on May 16, 2003, provisional application No. 60/560,176, filed on Apr. 7, 2004.

(51) Int. Cl.
A47F 7/00    (2006.01)
(52) U.S. Cl. .................................... 211/85.4
(58) Field of Classification Search ............. 211/85.4, 211/13.1, 59.1, 60.1, 70.7
See application file for complete search history.

(56) References Cited

U.S. PATENT DOCUMENTS

| | | | |
|---|---|---|---|
| 77,349 A | 4/1868 | Bigelow | |
| 1,061,431 A | 5/1913 | West | |
| 1,611,397 A | 12/1926 | Wells | |
| 2,338,396 A | 1/1944 | Meyer | 65/65 |
| 2,388,831 A | 11/1945 | Cramer | 99/421 |
| D183,005 S | 6/1958 | Krause | D81/10 |
| 3,329,082 A * | 7/1967 | Bruno | 99/421 R |
| 3,361,055 A | 1/1968 | Hondroulis | 99/421 |
| 4,074,102 A | 2/1978 | Asen | 219/10.55 E |
| D260,221 S | 8/1981 | Lee et al. | D7/85 |
| 4,407,189 A | 10/1983 | Bentson | 99/421 HH |
| 4,589,333 A | 5/1986 | Murphy | 99/419 |
| 4,659,890 A | 4/1987 | Viet | 219/10.55 M |
| 4,750,414 A | 6/1988 | Dohrs | 99/419 |
| 4,887,523 A * | 12/1989 | Murphy et al. | 99/419 |
| 4,924,768 A | 5/1990 | Jay | 99/425 |
| 5,720,217 A | 2/1998 | Pappas | 99/421 H |
| 5,837,979 A | 11/1998 | Fleck et al. | 219/732 |
| 5,908,576 A | 6/1999 | Henning | 219/753 |
| 5,996,820 A * | 12/1999 | Broadnax | 211/85.4 |
| 6,087,633 A * | 7/2000 | Lee | 219/392 |
| D444,340 S * | 7/2001 | Wang | D7/323 |

FOREIGN PATENT DOCUMENTS

FR    2 701 201    2/1993

* cited by examiner

*Primary Examiner*—Sarah Purol
(74) *Attorney, Agent, or Firm*—Suiter West Swantz pc llo

(57) ABSTRACT

A cooking device for cooking sweet corn allows the ears of corn being cooked to be suspended within a microwave oven cavity so that the corn may be cooked in a greatly reduced time compared to conventional cooking methods, while providing even cooking results. The cooking device comprises a base supporting one or more vertical supports capable of suspending ears of corn within a microwave oven cavity. Holders, inserted into the ends of ears of corn to be cooked, are received by the vertical support(s) for suspending the ear of corn.

32 Claims, 10 Drawing Sheets

COOKING DEVICE FOR COOKING CORN

CROSS-REFERENCE TO RELATED APPLICATIONS

The present application claims the benefit under 35 U.S.C. § 119(e) of U.S. Provisional Application Ser. Nos. 60/471,456, filed May 16, 2003, and 60/560,176, filed Apr. 7, 2004, which are herein incorporated by reference in their entirety.

FIELD OF THE INVENTION

The present invention generally relates to apparatus for cooking foods in microwave ovens, and more particularly, to an apparatus for cooking ears of sweet corn in a microwave oven.

BACKGROUND OF THE INVENTION

The traditional method of cooking sweet corn (i.e., "corn-on-the-cob") involves boiling the ears of corn in a large pot of water. This method requires extensive clean-up and is somewhat dangerous, since a relatively large amount of boiling water is required. Cooking corn in water is also time consuming because the user must first bring the water to a boil before the corn begins to cook. Further, any time boiling water must be used in the kitchen, there is the likelihood that the user or members of the user's family could accidentally be scalded.

With the advent of microwave ovens, it became possible to cook sweet corn more safely and quickly, without boiling water. Typically, to cook sweet corn in a microwave oven, the corn is placed on a microwave safe plate or dish and placed in the oven for the desired amount of time. However, this method (placing the corn on a microwave dish) results in uneven cooking of the corn, requiring frequent turning of the ears of corn to achieve the most even cooking. Turning the ears of corn increases the cooking time, which hinders the user in reaping the full benefits of the microwave oven. Turning of the ears of corn also subject the user to the possibility of minor scalding from steam emanating from the corn as it cooks.

Accordingly, it would be advantageous to provide an apparatus for cooking ears of sweet corn in a microwave oven that allows the ears of corn to be suspended within the microwave oven cavity, thereby providing greatly reduced cooking time and even cooking results.

SUMMARY OF THE INVENTION

Accordingly, the present invention is directed to a cooking device for cooking sweet corn wherein the ears of corn being cooked are suspended within the microwave oven cavity. In this manner, the cooking device allows sweet corn to be cooked in a greatly reduced time compared to conventional means, while providing even cooking results (i.e., the kernels of corn are cooked substantially evenly over the ear of corn). Generally, the cooking device of the present invention comprises a base supporting one or more supports capable of suspending ears of corn within a microwave oven cavity. Holders, inserted into the ends of ears of corn to be cooked, are received by the support(s) for suspending the ear of corn.

In one exemplary embodiment of the invention, the cooking device comprises a base supporting at least two supports for holding an ear of corn suspended above the base. Each of the supports is removably received in the top surface of the base so that they extend upward from the base. Holders, inserted in an ear of corn are received by the supports for suspending the ear of corn above the base while the corn is cooked. In this embodiment, one or more first apertures are formed at a first end of the base. A plurality of second apertures, aligned with respective ones of the first apertures, is formed in a second end of the base. These apertures are positioned at varying distances from the first apertures so that supports may be positioned at a variety of distances from one another to compensate for varying lengths of the ears of corn being cooked. Multiple sets of first and second apertures may be provided for receiving multiple supports allowing several ears of corn to be cooked at once. The base may further be equipped with a storage area for storing the supports when the cooking device is not being used. In these embodiments, the storage area is formed in an underneath surface of the base and comprises one or more sets of clips or clamps for securing the supports to the base.

In another exemplary embodiment of the invention, the cooking device includes a base, a first support coupled to the base at a first end of the base, comprising a panel provided with one or more holes or notches for supporting holders inserted within a first end of each of the ears of corn to be cooked, and one or more second supports for supporting holders inserted in the second ends of the ears of corn to be cooked, that are capable of being positioned within the base at varying distances from the first support to compensate for variation in the lengths of the ears of corn being cooked. In one specific embodiment, the second supports may comprise vertical posts equipped with notches for supporting the corn holders. Apertures formed in the base are spaced at varying distances from the first support for receiving the second supports. Alternatively, the second supports slide with slots formed in the base, thereby allowing the second supports to be positioned to hold ears of corn of varying lengths. In another specific embodiment, the second support comprises a second panel provided with one or more holes or notches for supporting holders inserted within a second end of each of the ears of corn to be cooked. The second support slides within one or more slots formed in the base.

In yet other exemplary embodiments of the invention, the cooking device includes a base, and a single support, coupled to the base, comprising a panel provided with one or more holes or notches for supporting holders inserted within an end of each of the ears of corn to be cooked. In these embodiments, the support suspends the ears of corn in a cantilever fashion without the aid of a second support. The first support may be angled slightly away from the ears of corn to ensure that the ears of corn remain suspended above the base.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
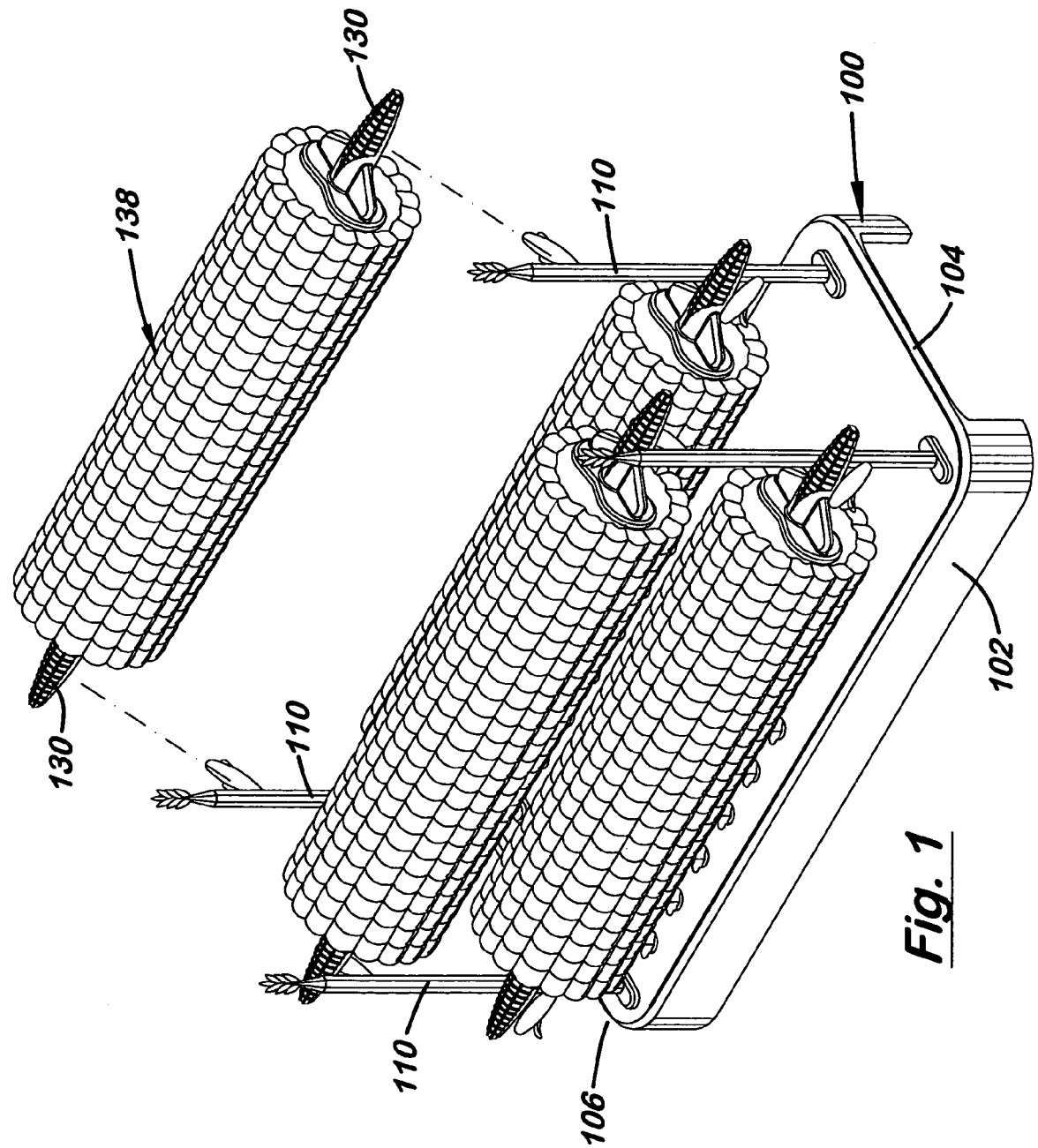
FIG. 1 is an isometric view illustrating a cooking device for cooking sweet corn in accordance with an exemplary embodiment of the present invention, wherein ears of sweet corn are supported by the cooking device.
Figure 2:
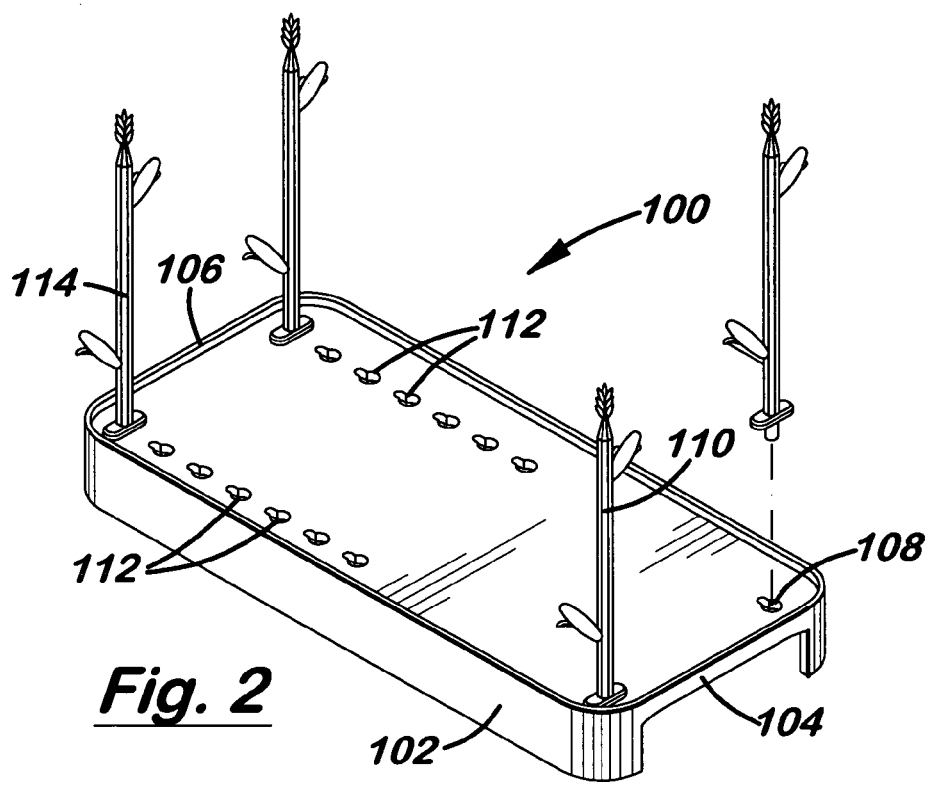
FIG. 2 is an isometric view illustrating a base and supports of the cooking device shown in FIG. 1.
Figure 3:
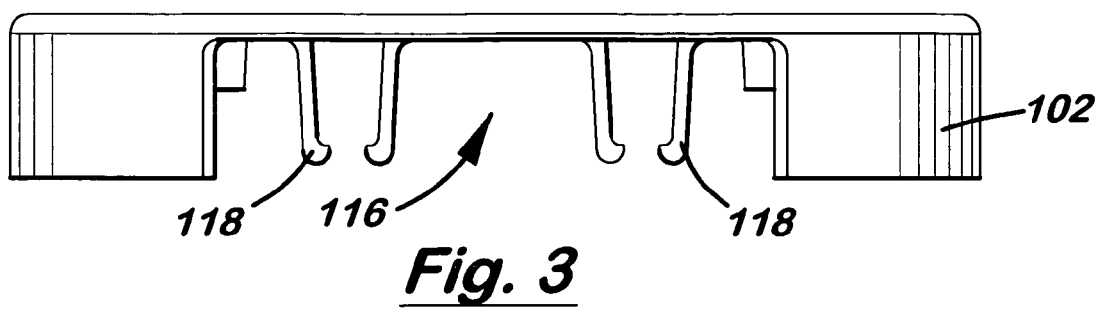
FIG. 3 is an end view depicting an end of the base shown in FIG. 2, further illustrating a storage area for storing the supports when the supports are not in use.
Figure 4:
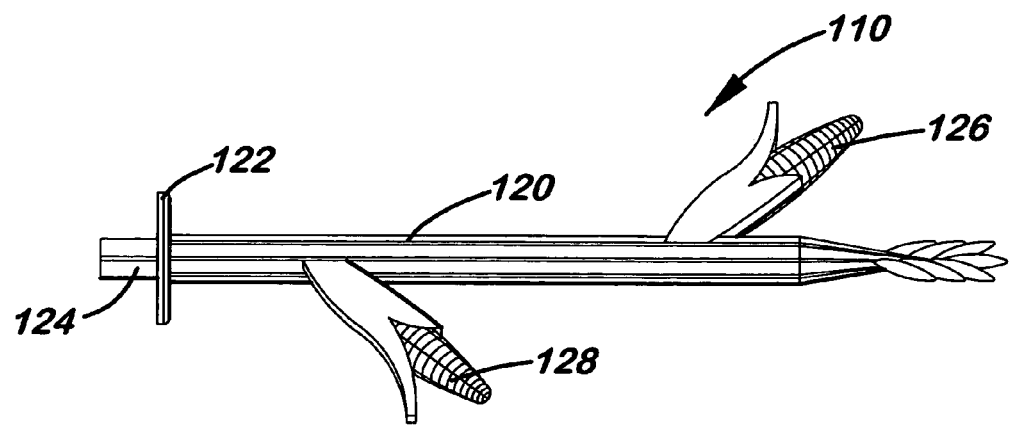
FIG. 4 is a side elevation view illustrating a support of the cooking device shown in FIG. 1.
Figure 5:
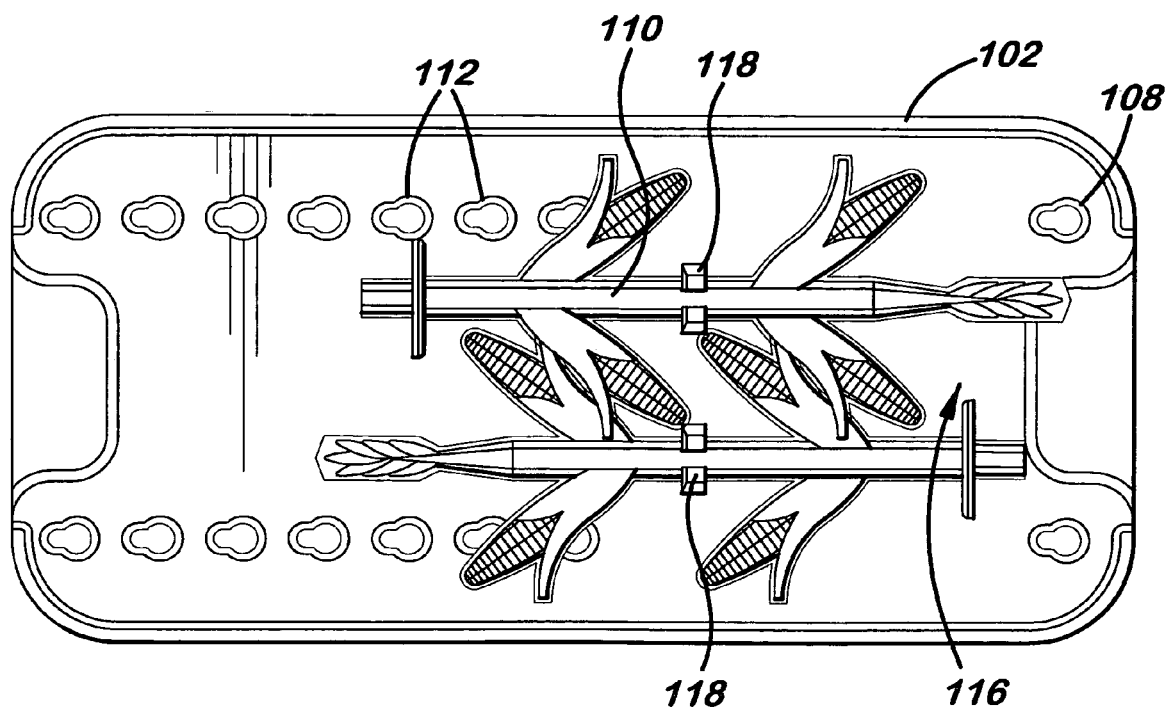
FIG. 5 is a bottom plan view of the base shown in FIG. 2, illustrating the storage area shown in FIG. 3.
Figure 6:
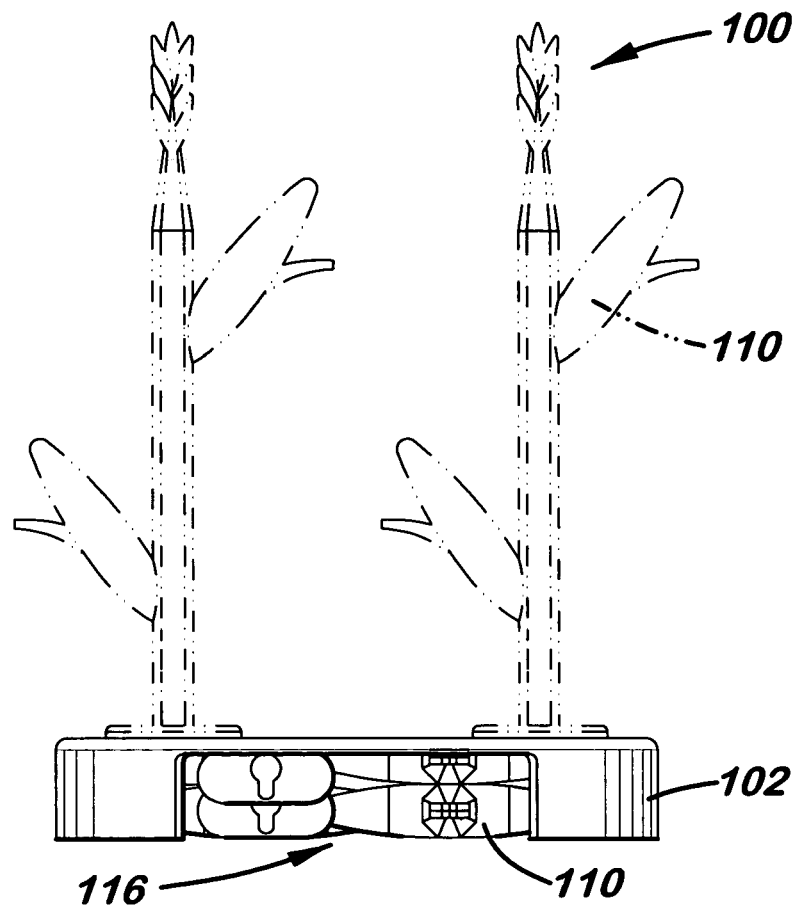
FIG. 6 is an end elevation view illustrating storage and use of the supports.
Figure 7:
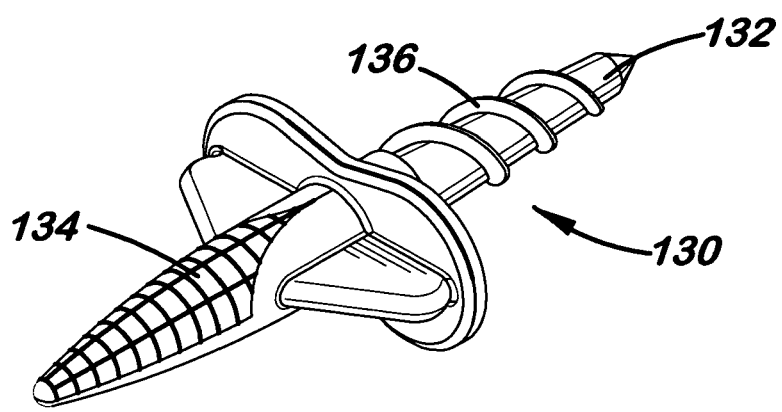
FIG. 7 is an isometric view illustrating a corn holder of the cooking device shown in FIG. 1.
Figure 8:
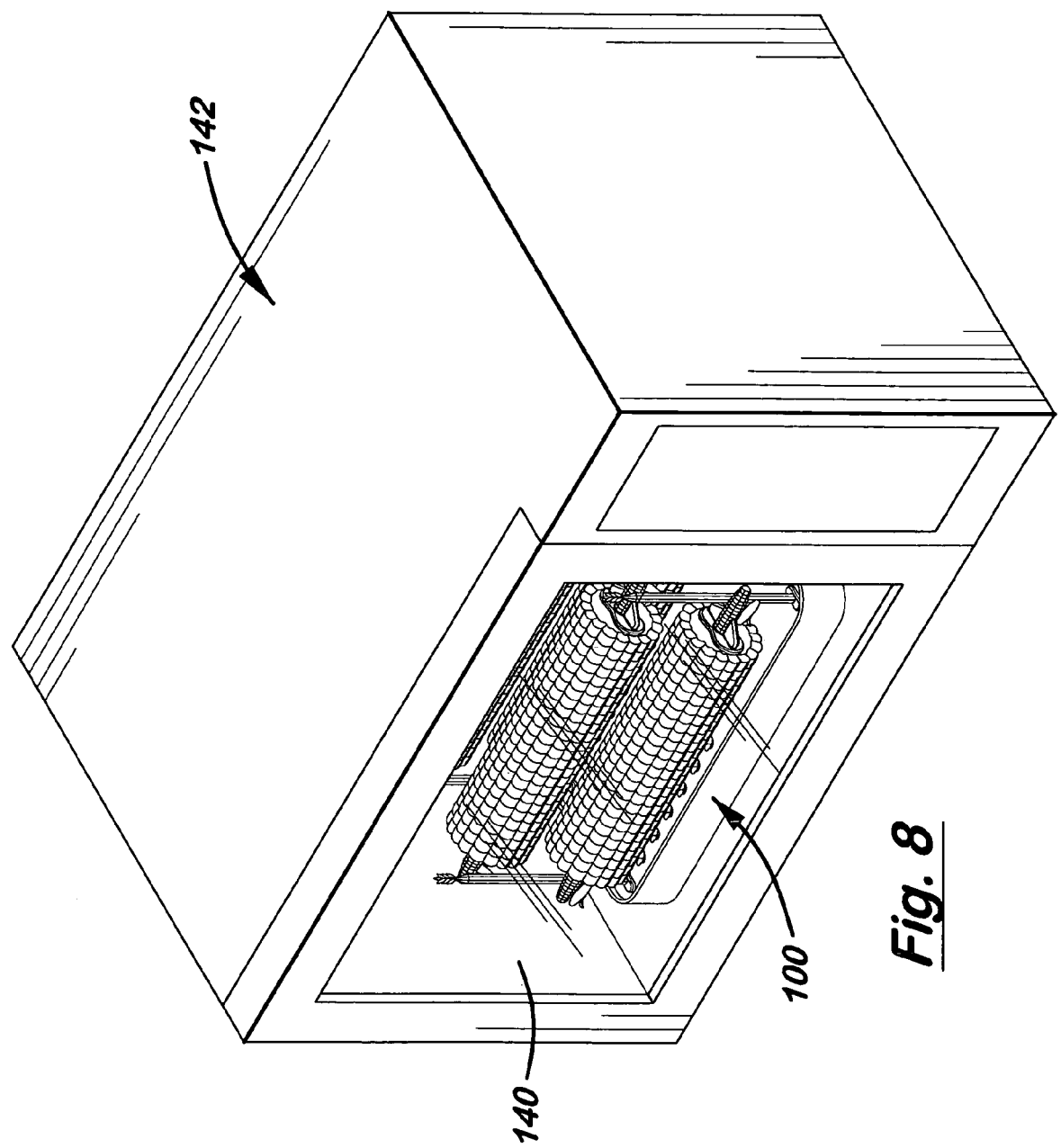
FIG. 8 is an isometric view illustrating the cooking device shown in FIG. 1, wherein the cooking device is placed within a microwave oven cavity for cooking ears of sweet corn supported by the cooking device.

Reference will now be made in detail to the presently preferred embodiments of the invention, examples of which are illustrated in the accompanying drawings.

Referring generally now to FIGS. 1 through 13, cooking devices for cooking sweet corn in accordance with exemplary embodiments of the present invention are described. Each cooking device includes a base for supporting one or more supports capable of suspending ears of corn, such as sweet corn, or the like, above the base. Preferably, the base and supports are sized appropriately for insertion within a microwave oven cavity, or the like, for cooking the sweet corn. Holders are inserted into the ends of the ears of corn and received by the vertical supports for suspending the ears of corn, so that the ears of corn rest securely on the vertical supports. In embodiments of the invention, the base includes an integrally formed tray for catching juices, bits of corn, and the like, that may fall while cooking an ear of corn. In one embodiment, the tray includes a lip that extends over the edge of the base.

Referring now to FIGS. 1 through 8, a cooking device 100 for cooking sweet corn in accordance with an exemplary embodiment of the present invention is described. The cooking device 100 includes a base 102 having a first end 104 and a second end 106. In embodiments of the invention, the base 102 includes functions as integrally formed tray for catching juices, bits of corn, and the like, that may fall while cooking an ear of corn. In one embodiment shown in FIG. 2, the tray may include a lip that extends upward from the edge of the base 102 for preventing juices, bits of corn, and the like from spilling from the tray.

In the embodiment illustrated, the base 102 is capable of supporting at least two supports, such as vertical supports 110 (four vertical supports 110 are shown in the embodiments illustrated), for holding one or more ears of corn suspended above the base 102. Each of the vertical supports 110 is removably received in the top surface of the base 102 so that the support 110 extends upward from the top surface of the base when received in the base 102. One or more first apertures, such as a first aperture 108, are formed at the first end 104 of the base 102. A plurality of second apertures, such as second apertures 112, are formed in a second end of the base and aligned with respective ones of the first apertures 108, forming a row of linearly aligned apertures. The second apertures 112 are positioned at varying distances from the first apertures 108 so that vertical supports 110 may be positioned at a variety of distances from one another to compensate for variation in the lengths of the ears of corn being cooked. For example, as illustrated, the first end 104 of the base 102 includes a first aperture 108 for accepting a vertical support 110. The second end 106 of the base 102 includes the row of linearly aligned second apertures 112 in which another vertical support 110 may be received so that the vertical supports 110 are linearly aligned with one another. To allow for varying lengths of corn, the linearly aligned apertures 112 are positioned at varying lengths from the first end 104 of the base 102, allowing the vertical supports 110 to be positioned at varying distances from one another. Multiple sets of first and second apertures 108 and 112 may be provided for receiving multiple vertical supports 110, allowing several ears of corn to be cooked at once.

In exemplary embodiments, first and second apertures 108 and 112 comprise holes that extend through the top surface of the base 102 (i.e., that do not include a bottom surface) to facilitate ease of cleaning of the base 102. Alternatively, first and second apertures 108 and 112 comprise recesses formed in the top surface of the base 102 and thus have a bottom surface. In this manner, juices, which may drip onto the top surface of the base 102 from ears of corn being cooked cannot pass through the apertures 108 and 112 and spill onto the bottom of the oven cavity. Moreover, in exemplary embodiments, first and second apertures 108 and 112 may be shaped to aid the user in properly aligning vertical supports 110 inserted in aligned groups of first and second apertures 108 and 112 with one another for supporting ears of corn. For example, in the embodiments shown, each of the first and second apertures 108 and 112 may comprise a generally cylindrical main portion having a keyway extending outward therefrom, which aligned with one another. However, it will be appreciated that first and second apertures 108 and 112 are not limited to this shape, but instead may employ other shapes (e.g., round, elliptical, square, rectangular, hexagonal, octagonal, irregular, or the like), which may or may not aid in aligning the vertical supports 110.

The base 102 may further include a storage area 116 for storing the vertical supports 110 when the cooking device is not being used. The storage area 116 is formed in an underneath or bottom surface of the base 102 and includes a clip assembly 118 having one or more sets of clips, clamps, fasteners, or the like, for securing the vertical supports to the base. For instance, the storage area 116 may include a clip assembly 118 having a clip shaped to secure the vertical supports 110 generally against the underside of the base when the vertical supports 110 are not in use. Because, the clip assembly 118 is placed within the base, the clip of the clip assembly 118 is protected from breakage, for example, while the cooking device 100 is stored in a kitchen drawer or cabinet. Alternatively, instead of providing a storage area 110 within the base 102, clips (such as a clip of clip assembly 118) may be provided on the top surface of the base 102. This positioning of the clips allows base 102 to be made thinner so that the cooking device 100 may be placed in microwave ovens having smaller oven cavities (e.g., cavities with a lower height) while still supporting the same number of ears of corn. Moreover, as shown, the plurality of clips 118 may be integrally formed with the base 102. However, the plurality of clips 118 may also be rigidly attached to the underside of the base 102 with an adhesive or a fastening device such as a screw or pin without departing from the scope and spirit of the present invention. It is further contemplated that the storage area 116 may include a variety of other fastening devices to securely house the vertical supports. 110, and alternatively, the holders (e.g., corn holder 130) to the base 102. Such fastening devices may include but are not limited to: a strap, a clamp, a latch, or the like. Those of ordinary skill in the art will appreciate that such other devices for securely housing the vertical supports 110 are constructed of materials suitable for use in a microwave oven or like oven employing microwave energy to cook foods.

In the exemplary embodiment illustrated, the vertical supports 110 include an upright member 120, a flange portion 122, a post portion 124, an upper arm 126, and a lower arm 128. The upper arm 126 and the lower arm 128 extend outwardly at an angle from the upright member 120. The upper arm 126 and the lower arm 128 may also be positioned on opposite sides of the upright member 120 for supporting corn holders, such as corn holders 130. The flange portion 122 of the vertical support 110 is located between the post portion 124 and the upright member 120 adjacent to the post portion 124, and extends outwardly and perpendicularly from the center stalk portion 120. Preferably, the flange portion 122 rests against the surface of the base 102 when the vertical support 110 is fully inserted into an aperture, i.e., either a first aperture 108 or a second aperture 112, formed in the base 102. When an ear of corn is supported by the vertical support 110, the post portion 124 supports the vertical support 110 in the aperture (i.e., first or second aperture 108 or 112). The flange portion 122 covers the aperture (i.e., first or second aperture 108 or 112), and may limit the distance the vertical support 110 may extend through the aperture. However, those of ordinary skill in the art will appreciate that the base 102 may be constructed for supporting a vertical support without a flange 122, such as with an aperture which does not pass completely through the base 102, or the like. The post portion 124 is an extension of the upright member 120, and is sized and shaped to be accepted by an aperture (e.g., apertures 108 and 112) so that the vertical support 110 is supported by the base 102. In the exemplary embodiment illustrated, the vertical supports 110 are formed in the ornate shape of a corn stalk. It will be appreciated that this shape is ornate, and that the vertical members 110 of the present embodiment are not limited to any particular ornate shape. For example, the vertical members may comprise a cylindrical upright member 120 having upper and lower arms 126 and 128 comprising hooks, or the like, for supporting the ears of corn to be cooked. Such modifications to the embodiment illustrated would not depart from the scope and spirit of the present invention.

Holders, such as a corn holder 130, or the like, are inserted into an ear of corn 138 and received by the vertical supports, such as the vertical support 110 or the like, for suspending the ear of corn above the base while the corn is cooked. For example, the corn holder 130 includes a lance portion 132 and a handle portion 134. The lance portion 132 is conical in shape for being inserted into the ear of corn 138, and comprises a helical ridge, thread, or the like. The helical ridge 136 provides mechanical advantage for inserting the corn holder 130 into the ear of corn 138 by allowing a user to twist the corn holder 130 to thread the lance portion 132 into the end of the ear of corn. The handle portion 134 is of a sufficient size to rest securely on either the upper arm 126 or the lower arm 128 of the vertical support 110. In addition, the handle portion 134 is of a sufficient size and shape to supply the user with a good grip for twisting the corn holder 130 into the ear of corn 138, and for holding the ear of corn as it is buttered, spiced, and/or eaten.

The cooking device 100 of the present invention allows ears of corn to be suspended in a microwave cavity 140 of a microwave oven 142, allowing for greatly reduced cooking time and more even cooking results. Further, use of the cooking device 100 may eliminate the need to rotate corn cooked in the microwave oven 142. In addition, because the corn holders 130 of the present invention are inserted into the ears of corn 138 prior to cooking (as opposed to after cooking), the risk to the user of being burned or scalded is greatly reduced. Moreover, water is conserved by using the present invention as opposed to the conventional cooking method (boiling).

Figure 9:
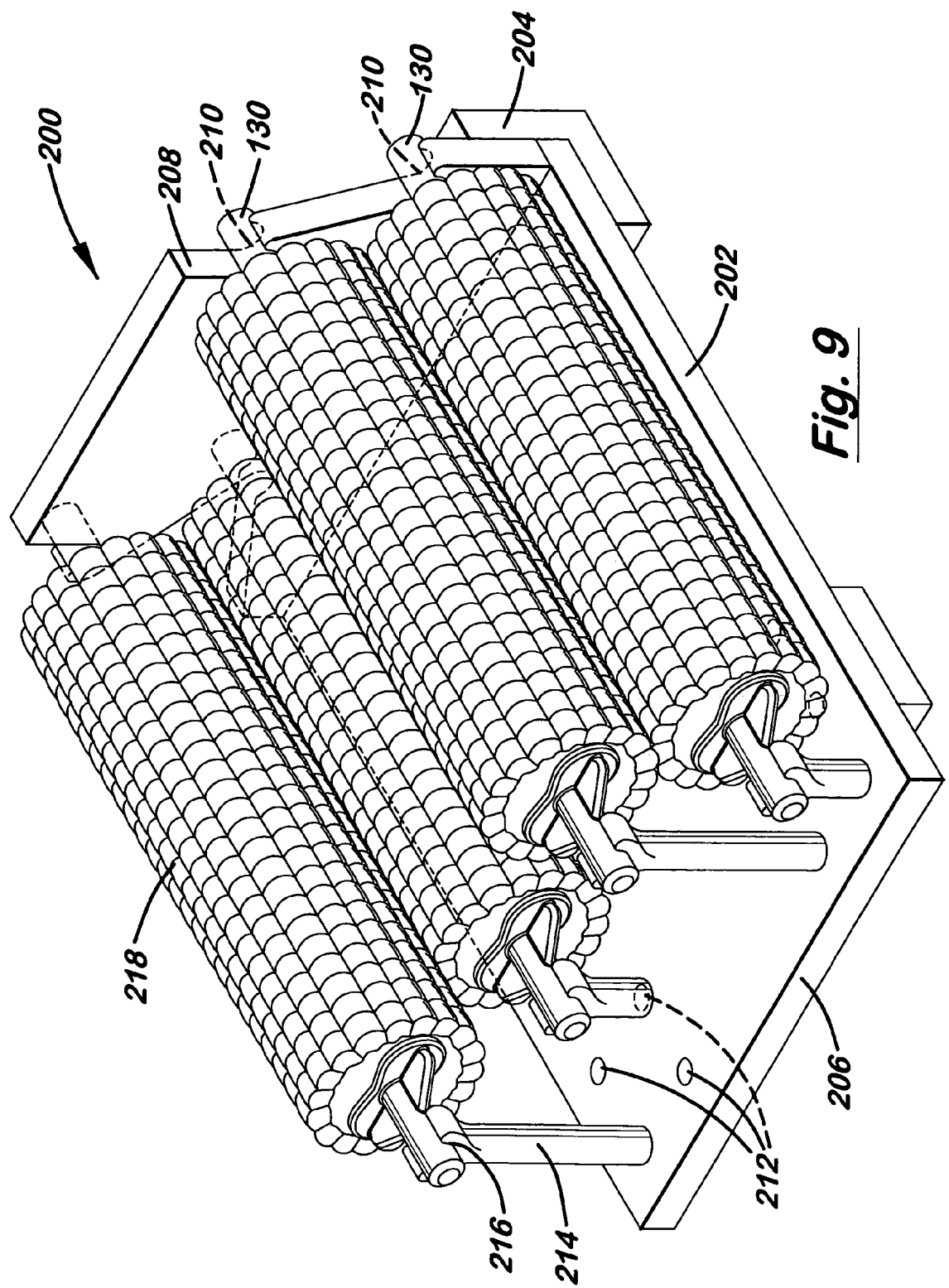
FIG. 9 is an isometric view illustrating a cooking device for cooking sweet corn in accordance with a second exemplary embodiment of the present invention.

Referring to FIG. 9, a cooking device 200 in accordance with a second exemplary embodiment of the invention is described. In this embodiment, the corn cooker 200 includes a base, a first vertical support, coupled to the base at a first end of the base, including a panel provided with one or more holes or notches for supporting holders inserted within a first end of each of the ears of corn to be cooked, and one or more second vertical supports for supporting holders inserted in the second ends of the ears of corn to be cooked, that are capable of being positioned upon the base at varying distances from the first vertical support to compensate for variation in the lengths of the ears of corn being cooked. For instance, a cooking device 200 for cooking sweet corn includes a base 202 with a first end 204 and a second end 206. A fixed vertical support 208 is rigidly coupled to the first end 204 of the base 202 and includes a panel having holes or notches 210 for supporting the corn holders 130. The second end 206 includes at least one row of linearly aligned apertures 212 in which at least one other second vertical support 214 may be received. The second vertical support 214 includes a vertical post equipped with a notch or the like for supporting the corn holder 130. Apertures are formed in the base spaced at varying distances from the first vertical support 208 for receiving the second vertical support. To compensate for varying lengths of corn 218, the linearly aligned apertures 212 are positioned at varying lengths from the first end 204 of the base 202, allowing the second vertical support 214 to be positioned at varying distances from the fixed vertical support 208. The second vertical support 214 may be a post equipped with a notch 216 at its top, the notch 216 being suitable for supporting the corn holder 130. The second vertical support 214 may also be of a sufficient size to be accepted by the aperture 212.

Figure 10:
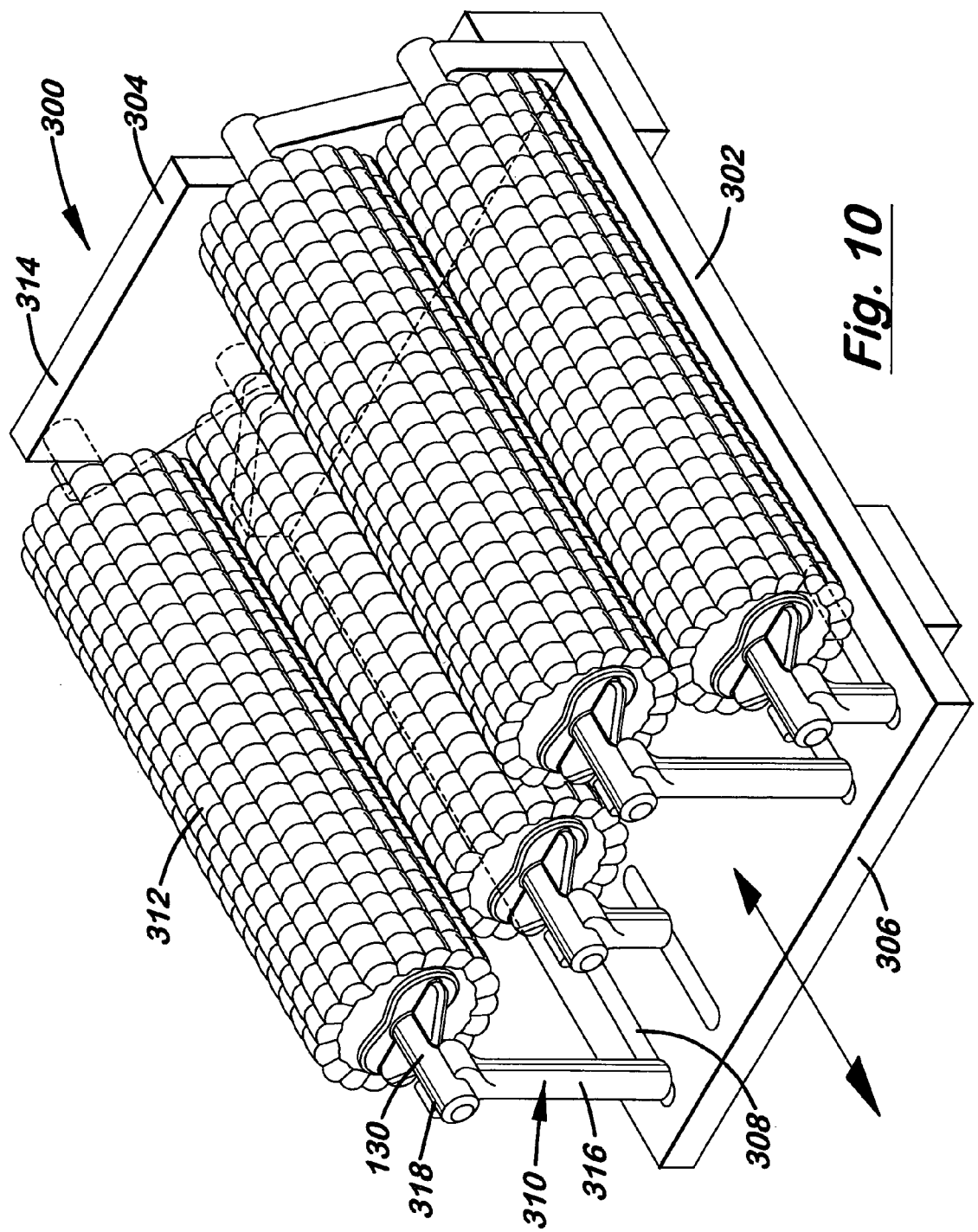
FIG. 10 is an isometric view illustrating a cooking device for cooking sweet corn in accordance with a third exemplary embodiment of the present invention.

Referring now to FIG. 10, a cooking device 300 in accordance with a third exemplary embodiment of the present invention is described. In this embodiment, the second vertical supports slide with slots formed in the base, thereby allowing the second vertical supports to be positioned to hold ears of corn of varying lengths. For example, a cooking device 300 includes a base 302 having a first end 304 and a second end 306. The first end 304 of the base 302 is provided with a fixed, vertical support 314. The base 302 is equipped with at least one slot 308 at the second end 306 for accepting at least one moveable vertical support 310. The slot 308 may run the length of the base 302 so that the moveable vertical support 310 may be positioned at any distance from a fixed vertical support 314. The moveable vertical support 310 may include a flange, a post 316, and a notch 318 for accepting the corn holder 130. The flange may be of a sufficient size and shape to be inserted into the slot 308 and, once inside the slot, to prevent the moveable vertical support 310 from becoming dislodged from its position when an ear of corn 312 is being supported. With this feature, the sweet corn cooker 300 may suspend several ears of corn 312 of many different lengths at the same time.

Figure 11:
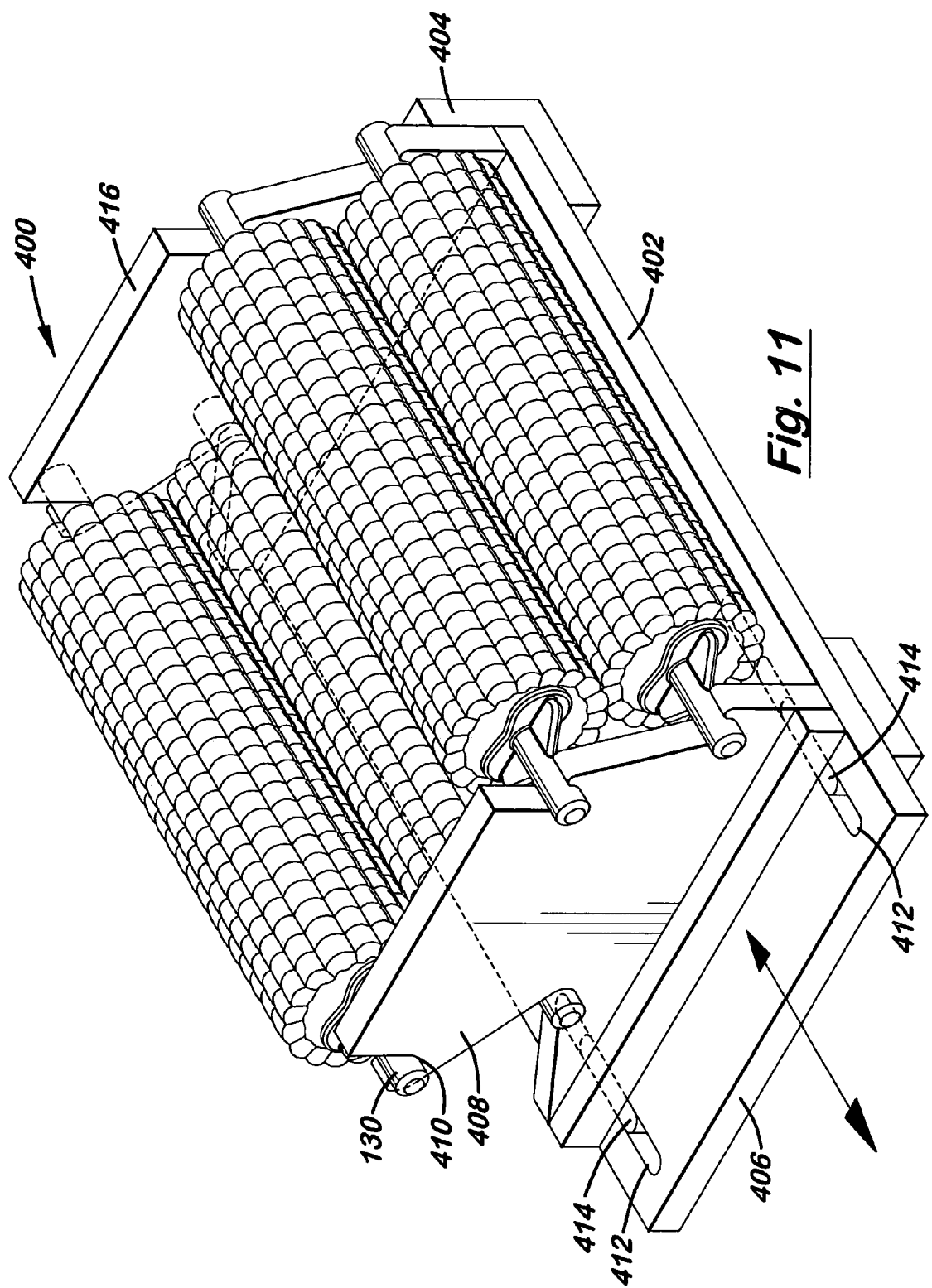
FIG. 11 is an isometric view illustrating a cooking device for cooking sweet corn in accordance with a fourth exemplary embodiment of the present invention.

Referring to FIG. 11, a cooking device 400 in accordance with a fourth exemplary embodiment of the present invention is described. In this embodiment, the second vertical support comprises a second panel having one or more holes or notches for supporting holders inserted within a second end of each of the ears of corn to be cooked. The second vertical support slides within one or more slots formed in the base. For instance, a cooking device 400 includes a base 402, a moveable vertical support 408, and a fixed vertical support 416. The fixed vertical support 416 is similar to the fixed vertical support 314 of the sweet corn cooker 300 previously discussed. The base 402 has a first end 404 and a second end 406. The base 402 may also include with two slots 412 for accepting rail members 414 of the moveable vertical support 408. The rail members may be of a sufficient size and shape to slide inside the slots 412 while at the same time providing stability to the moveable vertical support 408. The rail members 414 may also be an integral part of the moveable vertical support 408 or, alternatively, they may be coupled to the moveable vertical support 408 with an adhesive, a fastening device such as a screw or pin, or the like. Further, the moveable vertical support 408 may be a panel equipped with holes or notches 410 for supporting the corn holders 130. Because the slots 412 may run the entire length of the base 402, the moveable vertical support 408 may be positioned at different lengths from the fixed vertical support 416, which is located at the first end 404 of the base 402. Hence, the sweet corn cooker 400 may suspend ears of corn of several different lengths.

Figure 12:
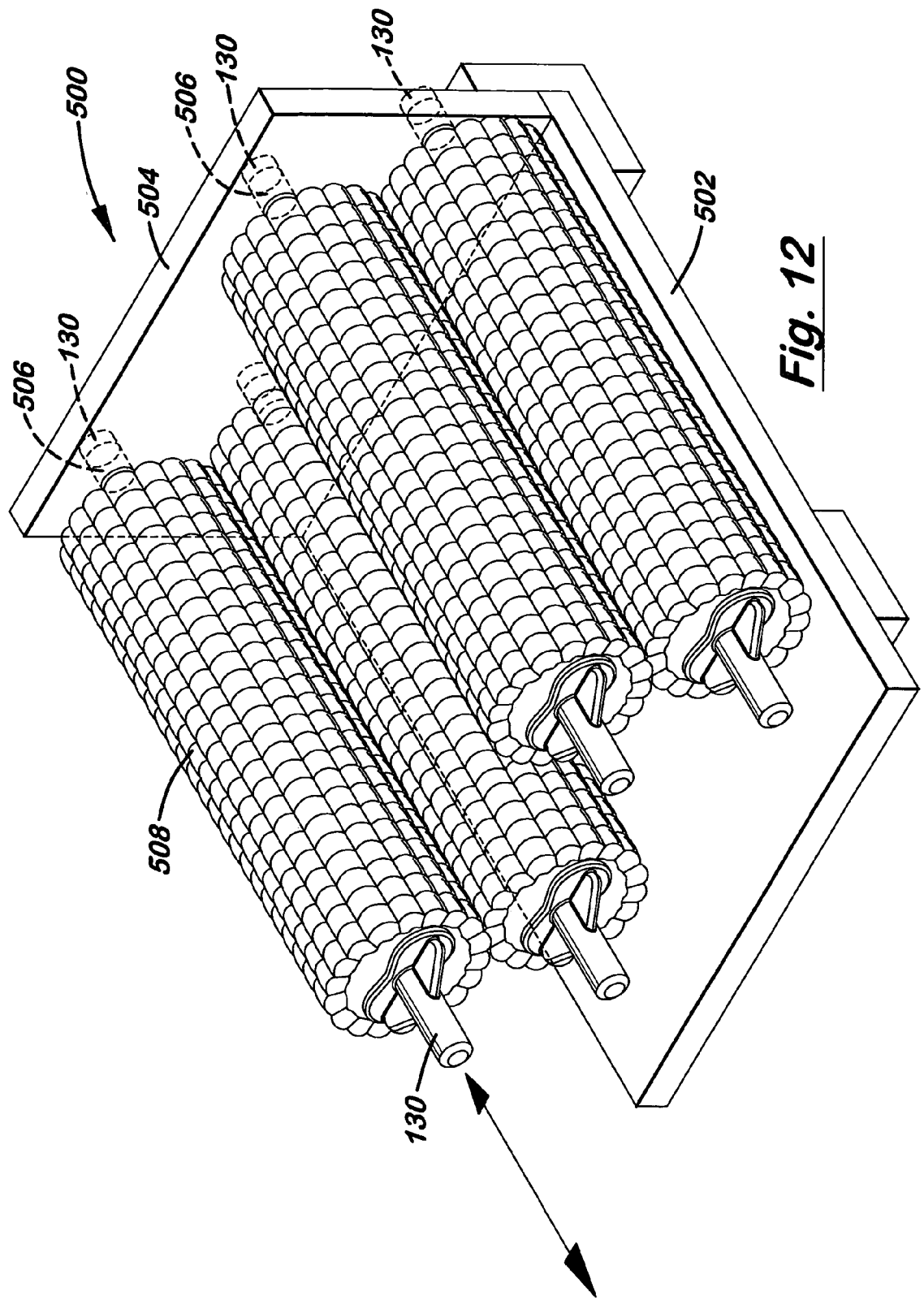
FIG. 12 is an isometric view illustrating a cooking device for cooking sweet corn in accordance with a fifth exemplary embodiment of the present invention.

Referring to FIG. 12, a cooking device 500 in accordance with a fifth exemplary embodiment of the present invention is described. In this embodiment, the cooking device 500 includes a base, and a single vertical support, coupled to the base, comprising a panel provided with one or more holes or notches for supporting holders inserted within an end of each of the ears of corn to be cooked. The single vertical support suspends the ears of corn in a cantilever fashion without the aid of another vertical support. The single vertical support may be angled slightly away from the ears of corn to ensure that the ears of corn remain suspended above the base. For example, a cooking device 500 for cooking sweet corn includes a base 502 and a fixed vertical support 504. The fixed vertical support 504 may be rigidly coupled to the base 502 and may include a plurality of apertures 506 spaced therein. The apertures 506 are of a sufficient size and shape so that the fixed vertical support 504 alone supports the corn holders 130. In this manner, ears of corn 508 are cantilevered from the fixed vertical support 504 over the base 502. No additional vertical supports are required. In specific examples of this embodiment, the fixed vertical support 504 may be angled away from the base 502 to aid in supporting the ears of corn 508. Once cooked, each ear of corn 508 may be grasped by the corn holder 130 inserted into the cantilevered end of the ear of corn 508 and lifted from the corn cooker 500, freeing the other corn holder 130 from the aperture 506 in which it was inserted.

Figure 13:
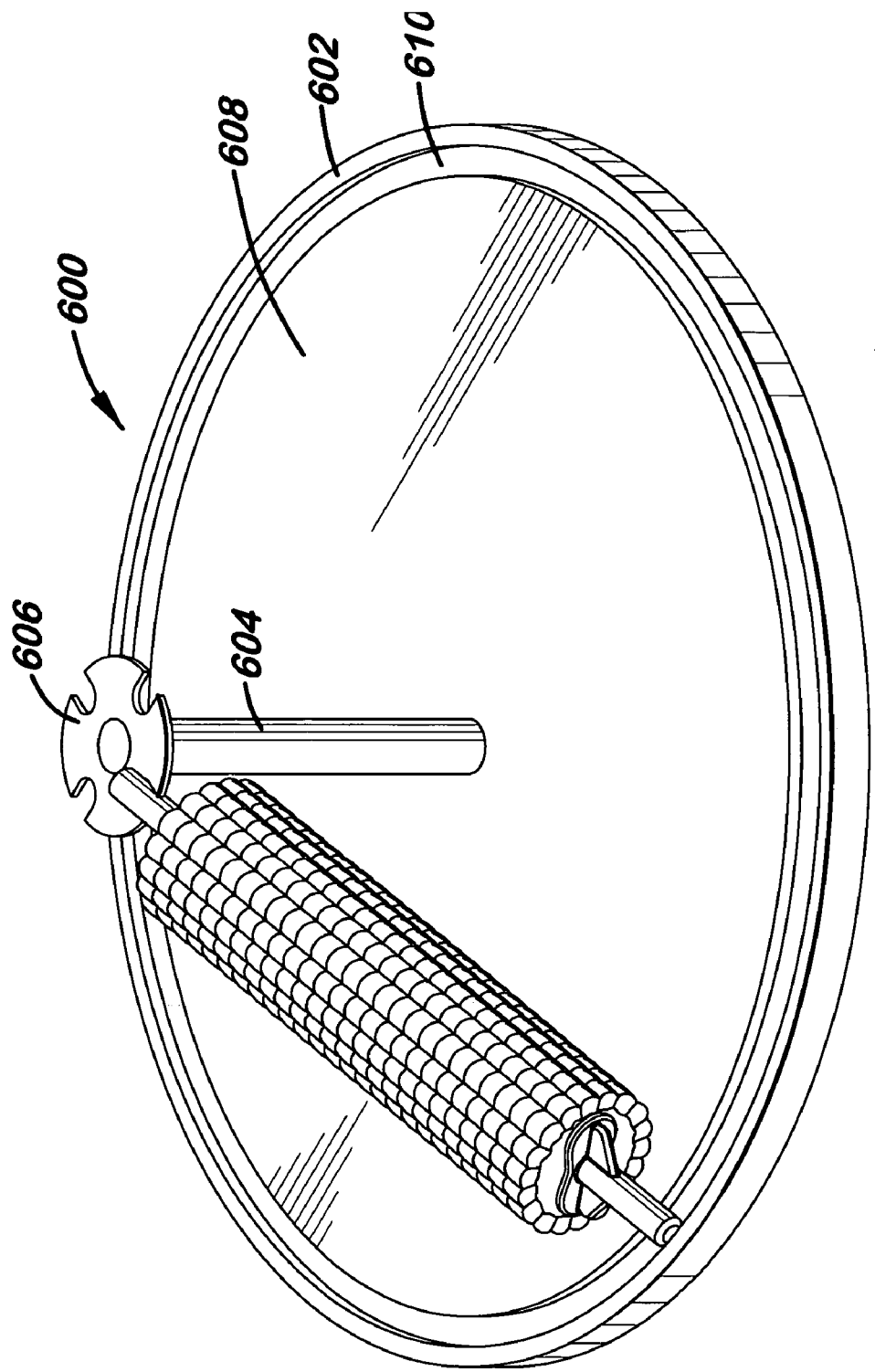
FIG. 13 is an isometric view illustrating a cooking device for cooking sweet corn in accordance with a sixth exemplary embodiment of the present invention.

Referring to FIG. 13, a cooking device 600 in accordance with a sixth exemplary embodiment of the present invention is described. In this embodiment, the cooking device 600 includes a base 602 and a single, centrally positioned vertical support 604, coupled to the base, having a top portion 606 shaped for supporting holders inserted within an end of each of the ears of corn to be cooked. The base 602 comprises a plate 608, which in the embodiment illustrated is round, but may alternatively have other shapes such as oval, square, rectangular, or the like, The periphery of the plate 608 includes a groove, a plurality of notches, a plurality of bumps, or the like, for supporting holders inserted in the ends of each of the ears of corn to be cooked opposite from the holder supported by the top portion 606 of the vertical support 604. In this manner, the cooking device suspends the ears of corn at an angle from the base 602 without the aid of a second vertical support.

It is believed that the cooking device of the present invention for cooking sweet corn and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A cooking device for cooking corn, comprising:
   a base having a top surface;
   at least two supports for holding an ear of corn suspended above the base, each of the at least two supports being removably received in the top surface of the base so that the supports extend upward from the base; and
   at least two holders for being inserted in an ear of corn, the at least two holders including a first holder for being inserted in a first end of the ear of corn and a second holder for being inserted in a second end of the ear of corn;
   wherein each of the at least two holders are received by one of the at least two supports for suspending the ear of corn above the base while the corn is cooked.

2. The cooking device as claimed in claim 1, wherein each of the at least two vertical supports comprises an upright member, an upper arm and a lower arm, each of the upper arm and the lower arm being disposed on opposite sides for at least partially for supporting one of the at least two holders.

3. The cooking device as claimed in claim 2, wherein the upper arm and the lower arm extend away from the upright member at an upward angle.

4. The cooking device as claimed in claim 2, wherein the holder includes a lance portion for being inserted into the end of the ear of corn and a handle portion, the handle portion being received by the support so that handle portion at least partially rests on one of the upper arm and the lower arm.

5. The cooking device as claimed in claim 4, wherein the lance portion is generally conical in shape and includes a helical ridge, the lance portion being threaded into the ear of corn for securing the holder to the ear of corn.

6. The cooking device as claimed in claim 5, wherein the upright member includes a post portion for being received in an aperture formed in the top surface of the base.

7. The cooking device as claimed in claim 6, wherein the upright member further comprises a flange disposed adjacent to the post portion.

8. The cooking device as claimed in claim 1, wherein the base further comprises a lip generally disposed about the perimeter of the top surface for holding juices dripped from the ear of corn.

9. The cooking device as claimed in claim 1, wherein the base includes a clip assembly for holding the first and second supports when the first and second supports are removed from the first and second apertures.

10. The cooking device as claimed in claim 9, wherein the base further includes a storage area, the clips being positioned within the storage area for storing the first and second supports within the base.

11. The cooking device as claimed in claim 1, wherein the base, at least two supports, and the at least two holders are formed of a plastic material suitable for use in a microwave oven.

12. A cooking device for cooking sweet corn, comprising:
a base having a first end and a second end, the first end being distal from the second end and having an aperture formed therein, the second end having a plurality of second apertures formed therein the plurality of second apertures being aligned with the first aperture;
at least two vertical supports for holding an ear of corn suspended above the base, a first one of the at least two vertical supports being removably received in the first aperture and a second one of the vertical supports being received in one of the plurality of second apertures; and
at least two holders for being inserted in an ear of corn, the at least two holders including a first holder for being inserted in a first end of the ear of corn and a second holder for being inserted in a second end of the ear of corn;
wherein the first holder is received by the first vertical support and the second holder is received in the second vertical support for suspending the ear of corn above the base while the corn is cooked.

13. The cooking device as claimed in claim 12, wherein each of the at least two vertical supports comprises an upright member, an upper arm and a lower arm, each of the upper arm and the lower arm being disposed on opposite sides of the upright member and extending away from the upright member at an upward angle for at least partially supporting one of the at least two holders.

14. The cooking device as claimed in claim 13, wherein the holder includes a lance portion for being inserted into the end of the ear of corn and a handle portion, the handle portion being received by the vertical support so that the handle portion rests on one of the upper arm and the lower arm.

15. The cooking device as claimed in claim 14, wherein the lance portion is generally conical in shape and includes a helical ridge, the lance portion being threaded into the ear of corn for securing the holder to the ear of corn.

16. The cooking device as claimed in claim 12, wherein the upright member includes a post portion for being received in one of the first aperture and one of the plurality of second apertures.

17. The cooking device as claimed in claim 16, wherein the post portion and first and second apertures are shaped to align the first vertical support with the second vertical support for suspending the ear of corn.

18. The cooking device as claimed in claim 17, wherein the post portion further comprises a flange disposed adjacent to the port portion.

19. The cooking device as claimed in claim 11, wherein the base further comprises a lip generally disposed about the perimeter of the base for holding juices dripped from the ear of corn.

20. The cooking device as claimed in claim 11, wherein the base includes a clip assembly for holding the first and second supports when the first and second supports are removed from the first and second apertures.

21. The cooking device as claimed in claim 20, wherein the base further includes a storage area, the clips being positioned within the storage area for storing the first and second vertical supports within the base.

22. The cooking device as claimed in claim 10, wherein the base, first and second vertical supports, and at least two holders are formed of a plastic material suitable for use in a microwave oven.

23. A cooking device for cooking sweet corn, comprising:
a base having a top surface;
at least two vertical supports for holding an ear of corn suspended above the base, each of the at least two vertical supports being removably received in the top surface of the base so that they extend upward from the base; and
at least two holders for being inserted in an ear of corn, the at least two holders including a first holder for being inserted in a first end of the ear of corn and a second holder for being inserted in a second end of the ear of corn;
a clip assembly formed in the base for holding the at least two vertical supports within the base when the at least two vertical supports are removed from the top surface of the base;
wherein each of the at least two holders are received by one of the at least two vertical supports for suspending the ear of corn above the base while the corn is cooked.

24. The cooking device as claimed in claim 23, wherein each of the at least two vertical supports comprises an upright member, an upper arm and a lower arm, each of the upper arm and the lower arm being disposed on opposite sides of the upright member and extending away from the upright member at an upward angle for at least partially for supporting one of the at least two holders.

25. The cooking device as claimed in claim 24, wherein the holder includes a lance portion for being inserted into the end of the ear of corn and a handle portion, the handle portion being received by the support so that the handle portion rests on one of the upper arm and the lower arm.

26. The cooking device as claimed in claim 25, wherein the lance portion is generally conical in shape and includes a helical ridge, the lance portion being threaded into the ear of corn for securing the holder to the ear of corn.

27. The cooking device as claimed in claim 24, wherein the upright member includes a post portion for being received in an aperture formed in the top surface of the base.

28. The cooking device as claimed in claim 27, wherein the upright member further comprises a flange disposed adjacent to the post portion.

29. The cooking device as claimed in claim 23, wherein the base further comprises a lip generally disposed about the perimeter of the top surface of the base for holding juices dripped from the ear of corn.

30. The cooking device as claimed in claim 23, wherein the base, at least two vertical supports, and the at least two holders are formed of a plastic material suitable for use in a microwave oven.

31. A cooking device for cooking sweet corn, comprising:
a base having a top surface;
means for suspending an ear of corn above the base, the suspending means being removably received in the top surface of the base so that the supporting means extend upward from the base; and
means for holding an ear of corn;
wherein the holding means is received by the suspending means for suspending the ear of corn above the base while the corn is cooked.

32. The cooking device as claimed in claim 30, wherein the base includes means for retaining the suspending means within the base when the suspending means is removed from the base.

* * * * *